United States Patent [19]
Farha et al.

[11] 3,937,850
[45] Feb. 10, 1976

[54] METHOD OF HOLLOWING OUT AN ARTICLE OF FOOD
[75] Inventors: Bahia Rashid Farha; Lloyd Lee, both of Charlton Heights, W. Va.
[73] Assignee: Bahia Rashid Farha, Charlton Heights, W. Va.
[22] Filed: Oct. 4, 1973
[21] Appl. No.: 403,575

Related U.S. Application Data
[62] Division of Ser. No. 212,943, Dec. 28, 1971, Pat. No. 3,780,435.

[52] U.S. Cl. .............. 426/484; 426/481; 426/514
[51] Int. Cl.² .......................................... A23P 1/00
[58] Field of Search .......... 426/482, 483, 514, 478, 426/481, 518, 484; 99/547, 564; 30/130, 263, 264, 283, 284, 276, 292, 123.6, 123.7, 113.1, 113.2, 113.3; 83/178, 195

[56] References Cited
UNITED STATES PATENTS

| | | | |
|---|---|---|---|
| 1,056,379 | 3/1913 | Thomas | 30/276 X |
| 1,565,960 | 12/1925 | Reynolds | 99/547 X |
| 1,603,061 | 10/1926 | Browne | 30/276 X |
| 2,542,426 | 2/1951 | Orling | 30/276 X |
| 2,820,496 | 1/1958 | Keiter | 99/564 X |
| 3,117,605 | 1/1964 | Creed et al. | 426/484 |
| 3,164,183 | 1/1965 | Kirkpatrick | 30/264 X |
| 3,271,855 | 9/1966 | Stolbach | 30/283 |
| 3,292,679 | 12/1966 | Roth | 30/123.7 |

Primary Examiner—Robert L. Lindsay, Jr.
Assistant Examiner—Steve Alvo
Attorney, Agent, or Firm—Browne, Beveridge, DeGrandi & Kline

[57] ABSTRACT

Method for hollowing out an article of food such as a fruit or vegetable so that a shell of substantially uniform predetermined thickness is formed. A rotating knife is rotated about its axis, while an end area of an article of food is guided with a curved guide member against the rotating knife. The guide member loosely supports the food for rotation and translation about its longitudinal axis while maintaining the knife a predetermined distance from the surface of the food. The distance between the guide and the blade is adjustable to control the thickness of the shell.

1 Claim, 10 Drawing Figures

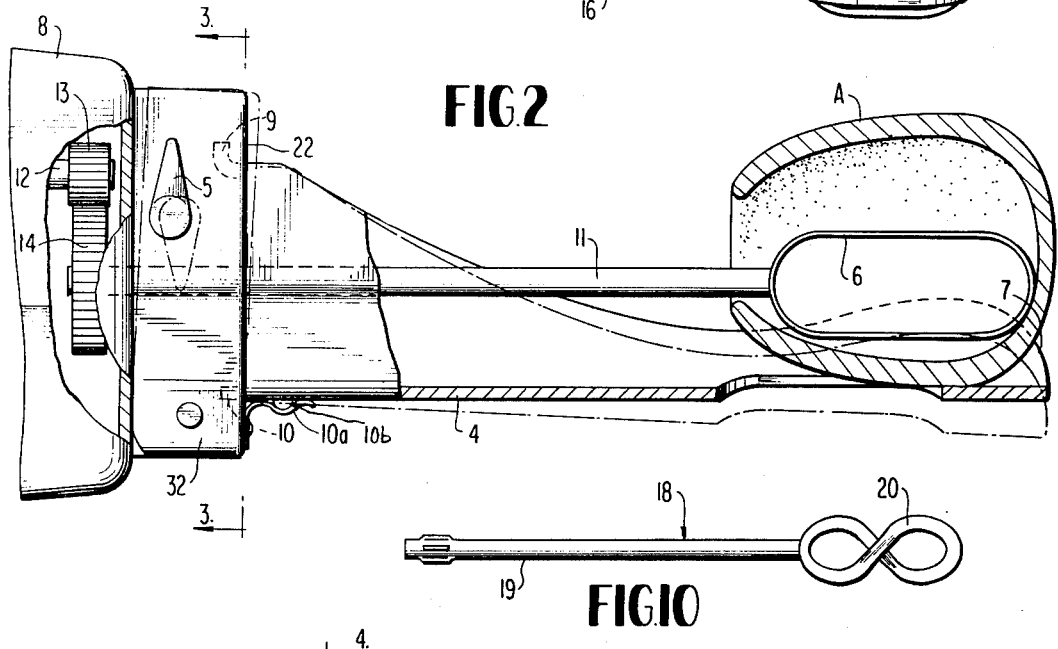

U.S. Patent    Feb. 10, 1976    Sheet 2 of 2    3,937,850
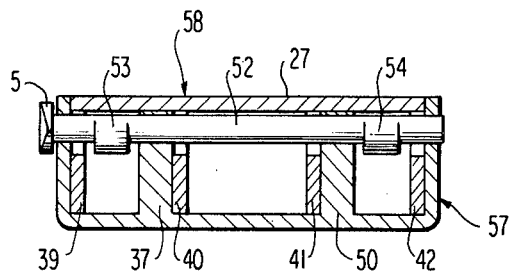
FIG.5
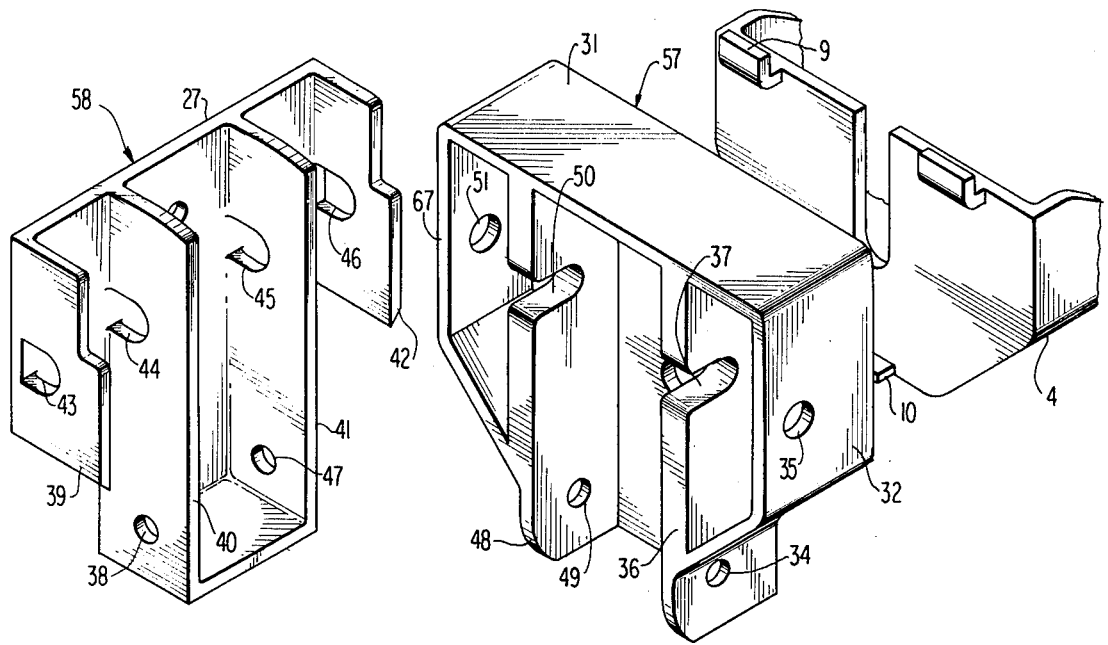
FIG.6
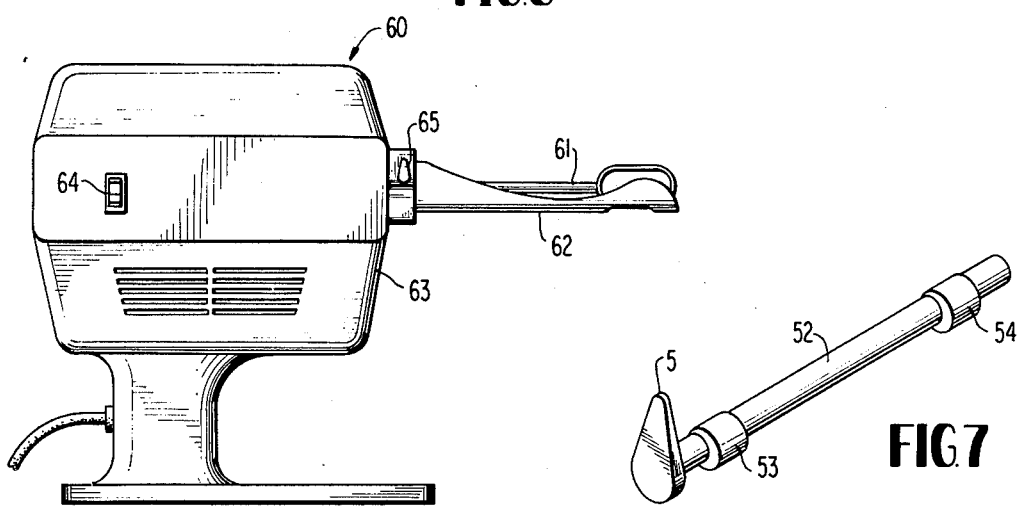
FIG.7
FIG.8

METHOD OF HOLLOWING OUT AN ARTICLE OF FOOD

This is a division of application Ser. No. 212,943, filed Dec. 28, 1971, now U.S. Pat. No. 3,780,435.

This invention relates to a method for hollowing out an article of food such as a fruit or vegetable to form a shell of substantially uniform thickness.

In the culinary arts, it is frequently desired to hollow out an article of food such as for instance a squash or an eggplant to form a shell which is then stuffed with some other food. It is extremely important that the shell which is formed be of substantially uniform thickness throughout both for purpose of structural rigidity and attractive appearance.

In the prior art, fruits and vegetables have been manually hollowed by the use of a hand knife to cut away the inside of the fruit or vegetable. However, there has been no way in the prior art to insure that the finished shell is of relatively uniform thickness throughout, this being entirely dependent upon the skill of the person performing the hollowing operation. Further, no means has been provided in the prior art by which the thickness of the shell could be controlled.

It is therefore an object of the present invention to provide a method for hollowing out an article of food which provides a shell of substantially uniform thickness.

It is a further object of the invention to provide a method and apparatus for cutting a hollowed portion in an article of food wherein the cross-sectional area of the hollow portion is greater than the cross-sectional area of the cutting means used.

It is a further object of the invention to provide a cutting device for hollowing out an article of food to form a shell, the thickness of which can be controlled.

The guide means guides the article of food onto the blade means so that the blade means contacts one end area of the article of food at a position displaced from the longitudinal axis of the article of food and at a distance from the surface of the article of food equal to the predetermined thickness of the shell to be formed. The blade means is power driven and rotates about its axis and the article of food is rotated and advanced onto the blade means while resting in the guide means. A shell is formed which is of the predetermined thickness and the hollow area of the shell because of the relative rotation of the blade means and the article of food is larger than the area of the blade means.

The above objects are accomplished by providing a cutting device which includes a longitudinally extending blade means having a longitudinally extending, curved guide means extending in substantially the same direction as the blade means for guiding the article of food while it is being hollowed.

Both the blade means and the guide means are attached at one end to a support means which includes a motor for rotating the blade means. The guide means is tiltably adjustable with respect to the support means and its position with respect to the blade means may be changed to provide shells of different thicknesses.

The structure and operation of the invention will become clearer by referring to the following figures and detailed description of an embodiment of the invention.

FIG. 1 is a side view of a device according to the invention.

FIG. 2 is a partially cutaway enlargement of the front part of the device illustrated in FIG. 1.

FIG. 3 is a sectional view taken through line 3—3 in FIG. 2.

FIG. 4 is a sectional view of a subassembly of the cutting device illustrated in FIG. 1 taken through lines 4—4 of FIG. 3.

FIG. 5 is a sectional view of a subassembly of the cutting device illustrated in FIG. 1 taken through lines 5—5 of FIG. 3.

FIG. 6 is an exploded perspective view of a subassembly of the cutting device of FIG. 1.

FIG. 7 is a perspective view of a cam shaft utilized in the cutting device of FIG. 1.

FIG. 8 is a side view of a preferred embodiment of a table model cutting device according to the invention.

FIGS. 9 and 10 are side views of cutting blades used in the cutting device of the invention.

FIG. 1 shows a side view of an embodiment of a manually operated cutting tool according to the invention. The cutting tool of FIG. 1 includes a housing 1 which houses a motor for rotating cutting blade 6. An electrical cord 3 is shown in FIG. 1 which is plugged into a conventional electrical outlet to provide a power source for the motor. In the alternative, a self-contained power source such as a battery source may be used for the motor and may also be housed in housing 1. Switch 2 is located on housing 1 and is used to turn the motor on and off.

Referring to FIG. 2 the motor (not shown) rotates shaft 12 which has gear 13 concentrically mounted. Gear 13 is in mesh with larger gear 14 which has shaft 11 concentrically and removably mounted therein by fins 16a as shown in FIG. 9. The rotation of shaft 12 by the motor thereby provides a torque to shaft 11.

Guide 4 shown in FIGS. 1 and 2 is also attached to housing 1 and may be removably attached to surface 22 by means of extensions 9 and 10 which fit into slots 23, 24 and 26 as shown in FIG. 3. Additionally, member 10a is secured to surface 22 which has a detent for accommodating ball 10b which is secured to the bottom of Guide 4. In the alternative, Guide 4 may be permanently secured to surface 22 of housing 1 by standard means, for instance by brackets.

Guide 4 extends in substantially the same direction as shaft 11 and blade 6. Guide 4 is a curved surface along its length and has ears 7 extending up on either side of the cutting portion of blade 6. While the ears 7 are shown in FIG. 1 as rising steeply to a point high on each side of the cutting portion, the shape of the front of the guide may be modified to suit individual requirements. For instance, if desired, the ears could be substantially shorter than shown in FIG. 1 and at a greater angle to the bottom of the guide.

The distance between the guide 4 and the cutting blade 6 is adjustable by turning knob 5 which causes guide 4 to pivot so that the angle between guide 4 and blade 6 is varied. Referring to FIGS. 4, 5 and 6, subassemblies 57 and 58 are part of housing 1 and is attached to the rear part of housing 1 by screws mounted through holes 29 and 30 in rear plate 27 of part 58. Part 57 to which guide means 4 is secured fits over part 58 as shown in FIGS. 5 and 6, so that portions 39 and 42 of part 58 are inside of and abut surfaces 32 and 67 of part 57, and surfaces 40 and 41 are inside of and abut surfaces 37 and 50 of part 57. Part 58 thus fits snugly inside of and is embraced by part 57. Parts 57 and 58 are held together by a shaft 25 shown in FIG. 3 which fits through holes 34, 38, 47, and 49 of parts 57 and 58. Shaft 25 may have retainers on its ends to insure that it does not come out of the holes.

Cam shaft 52 having knob 5 attached to one thereof and eccentrics 53 and 54 located thereon is inserted in holes 35, 43, 37, 44, 45, 50 and 51 of parts 57 and 58. When cam shaft 52 is rotated by knob 5 eccentrics, 53 and 54 bear against rear surface 27 of part 58 which transmits a forwardly directed force to part 57. Since this forwardly directed force occurs near the upper portion of part 57 with respect to pivot shaft 25, part 57 pivots around shaft 25 causing guide means 4 to be displaced with respect to stationary located shaft 11 and blade 6. Hence the thickness of the shell formed is controlled by rotating knob 5.

An article of food is hollowed out to form a shell of substantially uniform thickness by placing the article of food in guide 4 while cutting blade 6 is rotating. Guide 4 is adjusted so that the cutting blade contacts the article of food at a position on an end area of the article which is displaced from the longitudinal axis of the article as shown in FIG. 2. The article and tool are then relatively rotated with respect to each other either by rotating the article or the tool as the article is advanced on the blade. The advancing is stopped at a desired point before the blade cuts through the other end area of the article and a substantially uniform shell is formed. In order to ensure hollowing out of the entire desired area, the knife means should have an effective transverse cutting dimension of at least half of the transverse dimension of the desired hollowed out area. For instance, in FIG. 2 it is seen that the distance between the parallel cutting edges of blade 6 is greater than half of the transverse dimension of the shell. To change the thickness of the shell, it is only necessary to rotate knob 5 thereby tilting guide 4 with respect to part 8 of housing 1 and displacing it with respect to the blade to change the thickness of the shell.

FIGS. 1 and 2 show cutting blade 6 which is a cutting band of advantageous configuration.

FIG. 9 shows an alternate blade means which may be used with the cutting tool of the invention. In FIG. 9 assembly blade 15 is comprised of shaft 16 having fins 16a on one end thereof and cutting portion 17 on the other end thereof. Cutting portion 17 is comprised of 3 cutting bands which are spaced equidistantly around a 360° arc.

FIG. 10 shows blade assembly 18 comprised of shaft 19 and cutting portion 20 which comprises an elongated criss-crossing continuous band. The cutting blades disclosed herein have been found to be particularly effective in hollowing out articles of food.

FIG. 8 shows a table model embodiment of a cutting device 60 according to the invention. The cutting device 60 comprises housing 63 for housing a motor for rotating cutting means 61. Housing 63 has an on-off switch 64 and knob 65 thereon for adjusting the position of guide 62 with respect to shaft 61. The operation of cutting device 60 is similar to the operation of cutting tool of FIG. 1. However, in using cutting tool 60, the article of food is always rotated to provide the relative rotation between the tool and the article of food. Because cutting tool 60 is placed on a table where it is self-supporting, the operator has two hands available to manipulate the article of food. Motor housing 63 may be a universal housing which can accommodate many different accessories besides the cutting blade/guide combination of the invention.

While I have disclosed and described the preferred embodiments of my invention, I wish it understood that I do not intend to be restricted solely thereto, but that I do intend to include all embodiments thereof which would be apparent to one skilled in the art and which come within the spirit and scope of my invention.

We claim:

1. A method of hollowing out an article of food such as a fruit or vegetable having a longitudinal axis and two end areas to provide a shell of substantially, uniform thickness, comprising;

rotating a knife about its axis, guiding one of said end areas of said article of food against said rotating knife with a curved guide member loosely supporting said article of food for (1) rotation about said longitudinal axis and (2) translation in a direction substantially parallel to said longitudinal axis, relatively rotating said knife and said article of food with respect to each other about said longitudinal axis of said article of food while the guide maintains said knife a predetermined distance from the surface of said article of food and while simultaneously advancing said knife into said article of food in the longitudinal direction to a point short of the other end area of said article of food, thereby forming a shell of substantially uniform thickness and removing an inside area of the article of food which is greater than the cross-sectional area of the knife.

* * * * *